READ-WRITE MAGNETIC HEAD SWITCH

Filed Aug. 19, 1959

INVENTOR.
PETER SLAVIN

BY [signature]
AGENT

United States Patent Office 3,115,621
Patented Dec. 24, 1963

3,115,621

READ-WRITE MAGNETIC HEAD SWITCH

Peter Slavin, Philadelphia, Pa., assignor to Sperry Rand Corporation, New York, N.Y., a corporation of Delaware Filed Aug. 19, 1959, Ser. No. 834,879
9 Claims. (Cl. 340—174.1)

Figure 1:
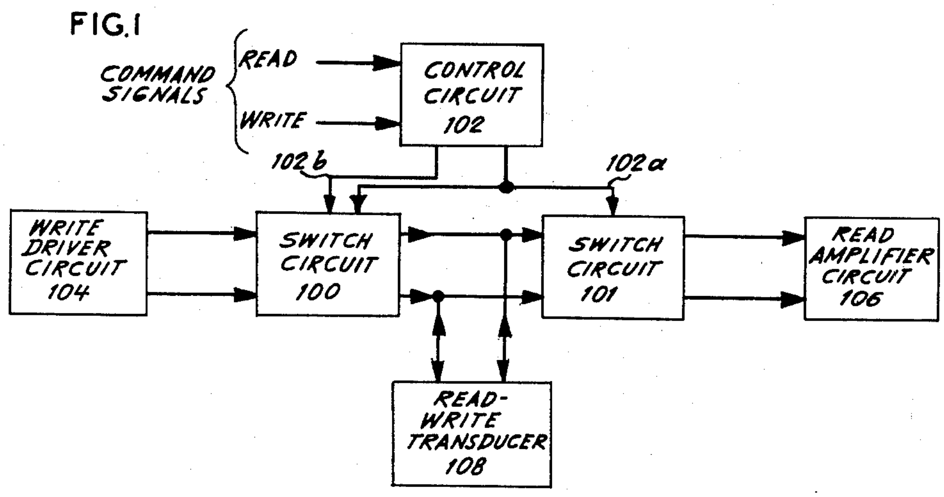

This invention relates to a switching circuit for selectively coupling an input-output element to either an input circuit or an output circuit. The present invention is particularly concerned with providing an efficient switching circuit which will permit the utilization of one magnetic transducer having a single energizing winding thereon as both a read-out and a write-in transducer in a magnetic recording system; and which will control the respective operations of the transducer.

At one time, in the field of magnetic recording and reproducing, it was necessary to make use of two or more magnetic transducers. That is, one transducer would be used to write information onto the surface of the storage device, and another transducer would be used to read the information which had previously been stored thereon. This operation was necessary because of the great difference in the magnitude of the write-in, read-out currents which were encountered in the coils on the transducers and the ineffective isolation of the read-write circuits.

Subsequently, a combined read-write head was developed. These combined heads operated with electro-mechanical switches (relays) which switched the coil circuit of the transducer from the read circuit to the write circuit and vice versa. However, this operation was limited in usefulness by the mechanical limitations of the relay switches.

The combined read-write head was later used in conjunction with diode or transistor switching devices. However, these devices did not always include positive decoupling of one circuit (read, for example) from the transducer when another (write) was to be used and vice versa. This, of course, created a problem in that spurious information could be fed into or out of an information storage system thereby decreasing the effectiveness of the system.

The present invention, which is especially well adapted for high speed digital data recording and reproducing, utilizes two separate sets of selectively biased semi-conductor devices as switching elements for controlling the intercoupling of the transducer to either the write circuit or the read circuit. In addition to eliminating the several detriments of the slow speed relay-switching mode of operation, the separate sets of switching elements are mutually exclusive networks which are controlled by a two-level control voltage. That is, when the control voltage is at one level, a first set of semi-conductors are actuated so that the transducer is positively coupled to the read circuit, for example. At the same time, the other set of semi-conductors is actuated so that the transducer is positively decoupled from the write circuit. Conversely, when the control voltage is at the second level, the transducer is positively coupled to the write circuit and positively decoupled from the read circuit. The positive coupling and decoupling of this semi-conductor switching circuit promotes far more efficient operation in that the cross-talk which is frequently encountered between the read and write circuits is eliminated due to the complete isolation of the circuits. Moreover, a protective network is utilized which automatically prevents a spurious high magnitude write output signal from being applied to the read input circuit.

An object of this invention is to provide a means for controlling the magnitude of a signal current through a magnetic transducer.

Another object of the invention is to provide a means for switching a magnetic transducer between different circuits.

A further object of the invention is to accomplish transducer switching between a read and a write circuit so that either one of said circuits may be utilized independently and with a high degree of isolation from the other of said circuits.

Another object of the invention is to provide a switching circuit which is simple in construction and high-speed in operation.

Figure 2:
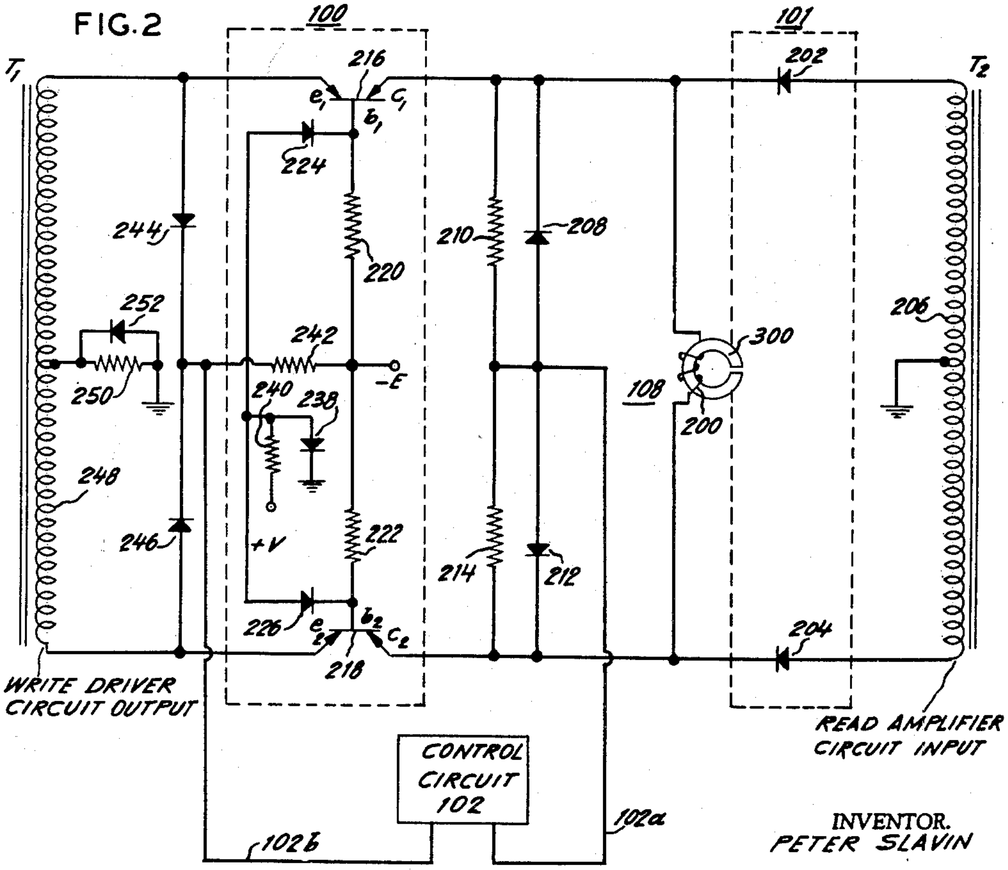

These and other objects of the invention will be explained in the following description taken in conjunction with the accompanying drawings, in which:

FIGURE 1 is a simplified block diagram showing the novel switching circuits of the invention connecting a magnetic transducer to write or read circuits; and FIGURE 2 is a schematic diagram of the switching circuits.

Referring now to FIGURE 1, the electronic switching circuits 100 and 101, which will be described subsequently are fed by a control signal source 102. Source 102 may be any known type of voltage generator for producing an output voltage having two different voltage levels, for example, a flip-flop circuit which can be set to one condition by a read control signal and to the other condition by a write control signal. Switching circuits 100 and 101 are connected to a magnetic transducer 108, for selectively connecting transducer 108 to a write driver circuit 104 or a read amplifier circuit 106 according to the level of the control voltage supplied by source 102. The transducer may be of the type utilizing a single winding linked to a core of magnetic material and having an airgap.

Briefly, the operation of FIGURE 1 is as follows: In response to a read command signal, control circuit 102 produces an output voltage of one level which will open switch circuit 100 and simultaneously close switch circuit 101 to thereby positively decouple write circuit 104 from the transducer 108 and at the same time positively couple transducer 108 to the read circuit 106. Conversely, in response to a write command signal, control circuit 102 produces an output voltage of a second level which will open switch circuit 101 and close switch circuit 100 to thereby positively decouple the read circuit from transducer 108 and positively couple the transducer 108 to the write circuit 104.

FIGURE 2 shows in detail the connections of the several circuits shown in FIGURE 1 and referred to above. According to FIGURE 2, a first end of the winding 200 on magnetic core 300 of transducer 108 is connected to the cathode of diode 202. The anode of diode 202 is connected to one end of the center-tapped primary winding 206 of the read amplifier input transformer $T_2$. The second end of winding 200 is connected to the cathode of diode 204. The anode of diode 204 is connected to the other end of primary winding 206. The first end of winding 200 is further connected to the cathode of diode 208 and one end of resistor 210. The other end of resistor 210 is connected to the anode of diode 208 and to the control signal source 102. The second end of the winding 200 is further connected to the cathode of diode 212 and one end of resistor 214. The other end of resistor 214 is connected to the anode of diode 212 and to the control signal source 102. In addition, the collector electrodes $c_1$ and $c_2$ of bilateral transistors 216 and 218 are connected to the first and second ends of winding 200 respectively. The bilateral transistors may be of the type manufactured by General Electric and designated by the number 4JD1B4. The base electrode $b_1$ of transistor 216 is connected by means of resistor 220 to the negative voltage source —E, the positive terminal of which may be connected to ground.

This negative voltage source is also connected to base $b_2$ of transistor 218 by resistor 222. The bases $b_1$ and $b_2$ are respectively connected to a voltage clamping circuit by diodes 224 and 226 each of which has its cathode connected to the associated transistor base electrode. The clamping circuit shown in FIGURE 2 comprises diode 238, the cathode of which is grounded, and resistor 240. Resistor 240 is connected between a positive voltage source +V and the anode of diode 238. The anode of diode 238 is further connected to the anodes of diodes 224 and 226. The negative voltage source −E is connected by means of resistor 242 to the cathode of diode 244 whose anode is connected to the emitter electrode $e_1$ of transistor 216. Resistor 242 is also connected to the cathode of diode 246 whose anode is connected to the emitter $e_2$ of transistor 218. The emitters ($e_1$ and $e_2$) are connected to opposite ends of secondary winding 248 of the write driver transformer $T_1$ respectively. Winding 248 is center-tapped through the parallel circuit combination of resistor 250 and diode 252 whose anode is connected to ground.

For a description of the operation of the circuit as shown in FIGURE 2, it will first be assumed that binary digital information is to be stored on a magnetic drum, for example. The type of recording, that is whether the information is recorded in the return-to-zero or the non-return-to-zero modes is optional and the write "1" and write "0" generators are considered conventional and, therefore, are not shown. It is to be understood, however, that such generators may be coupled to the input side of transformer $T_1$. In the write operation, the control signal source 102, which produces control signal voltages on lead 102$a$ of two different levels, supplies a high level signal of +5 volts, for example, to the anodes of diodes 208 and 212. Since these diodes are forward biased, they present very little impedance to the control signal and, consequently, there is a negligible voltage drop thereacross whereby substantially a 5 volt step is applied to the cathodes of diodes 202 and 204 thereby back-biasing these diodes and switching them off. When diodes 202 and 204, which are connected to the primary winding 206 of the read circuit input transformer $T_2$, are switched off they present an extremely high impedance to any spurious signals which might possibly be detected by the winding 200 on transducer 108. Thus, it may be seen that the read circuit is positively decoupled from winding 200.

At the same time, the positive step signal is applied to the collector electrodes of transistors 216 and 218. This application of a positive voltage to the collectors of the transistors causes the transistors to be turned on as more fully described hereinafter. Since these transistors are of the bilateral type, current may flow in either direction once the semi-conductor has been turned on. Therefore, when the control signal level is positive to turn on the transistors, any A.C. signal which is generated in the secondary winding 248 of transformer $T_1$ by the write driver circuit 104 may pass through the transistors 216 and 218, which are now low impedances, and then through the winding 200 of transducer 108. Accordingly then, transducer 108 may write information onto the information storage device in the usual manner. For example, in writing a "1," current may flow from the upper terminal of transformer $T_1$ through the conducting transistor 216 down through transducer coil 200 and back to the lower side of transformer $T_1$ via transistor 218. In writing a "0," current may be assumed to flow from the lower end of transformer $T_1$, through transistor 218, up through winding 200 of transducer 108 and back to the upper side of transformer $T_1$ via transistor 216.

The switching of the transistors 216 and 218 may be more fully understood when it is understood that the bases of the transistors are each clamped to a potential of +1.5 volts. This is accomplished by using a clamping circuit, comprising, for example, resistor 240 which is connected from a positive potential source +V to the anodes of diodes 224 and 226, and diode 238 which is connected between ground and the anodes of diodes 224 and 226. Diode 238 is so chosen that when current flows from positive voltage source +V, through resistor 240, through diode 238 to ground a potential of 1.5 volts is dropped across the diode. The 1.5 volt potential is applied at the bases of the transistors by diodes 224 and 226. This is only one type of clamping circuit which may be used, however, and any of the known type may be used, as for example, a properly poled battery. As will be discussed subsequently, a potential which is negative with respect to ground is applied to the collector electrodes $c_1$ and $c_2$ when the switch is in the read position. However, when the signal applied on lead 102$a$ by the switching signal source 102 is a +5 volt step, the collectors become more positive than the bases and the transistors may conduct. As previously indicated, once the transistors have been turned on in one direction, they are then capable of conducting equally well in either direction and a signal may pass from the secondary winding 248 of the write driver transformer $T_1$, through the transistor 216 or 218 to the transducer winding 200.

To summarize the above action, when the control voltage on line 102$a$ goes to +5 volts diodes 208 and 212 conduct, placing essentially 5 volts back bias on diodes 202 and 204 thereby blocking these latter two diodes and decoupling the read transformer $T_2$ from magnetic head 108. This +5 volts applied to the collectors $c_1$ and $c_2$ of transistors 216 and 218 turns the transistors on and thereby couples the write transformer $T_1$ to the head 108.

In the event that a signal is to be read from the surface of the magnetic storage drum, it is necessary that the control signal source 102 produce the other of its two different level signals. That is, a signal of −5 volts, for example, must be supplied by the control signal source on line 102$a$. The −5 volt signal will simultaneously cut off transistors 216 and 218 and turn on diodes 202 and 204. This operation is as follows: The application of the −5 volt signal cuts off diodes 208 and 212 but causes current to flow from the grounded center tap of input winding 206 through the diodes 202 and 204 and resistors 210 and 214 to lead-line 102$a$. These resistors are so chosen that (1) substantially all of the −5 volt signal is dropped thereacross and (2) the current that flows through diodes 202 and 204 is at the same time greater than the reading current induced in head 108 during a read operation. Thus, a small negative potential is applied to the collectors $c_1$ and $c_2$. This potential may be, for example, approximately −0.8 volt, but since the bases of the transistors are clamped at +1.5 volts, the transistors are cut off.

To summarize the above action, when the control voltage on line 102$a$ is established at −5 volts, current in excess of the normal read current induced in winding 200 during a read operation is made to flow through diodes 202 and 204, thereby coupling transducer 108 to the read circuit transformer $T_2$. At the same time, the collectors $c_1$ and $c_2$ of transistors 216 and 218 are biased negative of their bases and transistors 216 and 218 are cut off to decouple the write circuit from the head 108.

Thus, it may be seen that, upon the application of a certain control signal, the transducer 108 may be connected to either the write circuit or the read circuit and completely isolated from the other circuit respectively. That is, assuming that the transducer is to be connected to the write circuit, it may be seen that diodes 202 and 204 are automatically back-biased to cut off. Since the signals utilized in the read circuit are small, the cut off diodes provide an effective block to a spurious read signal as discussed previously. Conversely, in order to read information from the storage device, the transducer is to be connected to the read circuit and the transistors 216 and 218 are cut off as previously explained.

Since the write circuit produces signals of large magnitude a further protective network may be utilized if desired. This protective network comprises diodes 244 and 246 which have their cathodes conected to the negative voltage —E by means of resistor 242. The cathode of diodes 244 and 246 are connected through line 102b to an output of control voltage source 102. The output signals supplied via line 102b are controlled by the same signals which are applied to line 102a. During a read operation, an output voltage on lead 102b is negative and current will flow from ground through diode 252 and thence through diodes 244 and 246 to the control line 102b. This places a small negative voltage at the emitters $e_1$ and $e_2$ of transistors 216 and 218 to further bias these transistors off and at the same time short-circuits the secondary winding 248 via diodes 244 and 246 to thereby prevent spurious write signals from entering the head 108. On write, however, line 102b goes positive, for example +35 volts, to block diodes 244 and 246 thereby to remove the short circuit from across the secondary winding 248. In practice, the potential applied to the cathodes of the diodes 244 and 246 during a write operation must be greater than the anticipated peak-to-peak amplitude of the potential at the secondary winding 248 of the output driver transformer $T_1$ in order to insure that the diodes 244 and 246 remain cut off. This positive excursion of lead 102b also removes the emitter bias from transistors 216 and 218 to permit the write currents produced in transformer 248 to pass through transistors 216 and 218 into the head winding 200 of transducer 108.

Thus, there is described a preferred apparatus and its method of operation in accordance with the present invention. It must be emphasized, however, that the foregoing description is meant to be illustrative only and should not be considered limitative of the invention and variations may be suggested to those skilled in the art. All variations and modifications, as are in accord with the principles herein described, are meant to fall with the scope of the appended claims.

What is claimed is:

1. In combination, a single input-output element comprising a magnetic transducer, an input circuit, an output circuit, a first electronic switching circuit transformer coupled to said input circuit and adapted to electrically couple said input circuit to said input-output element in response to a control voltage of one level and further responsive to a control voltage of a different level for electrically decoupling said input circuit from said input-output element, a second electronic switching circuit separately transformer coupled to said output circuit and responsive to a control voltage of said one level for electrically decoupling said input-output element from said output circuit and responsive to a control voltage of said different level for electrically coupling said input-output element to said output circuit, and means for selectively supplying a control voltage either of said one level or said different level to said first and second electronic switching circuits coincidentally.

2. In combination, a single input-output element comprising a magnetic transducer, an input circuit, an output circuit, a first electronic switching circuit coupled to said input circuit and adapted to couple said input circuit to said input-output element in response to a control voltage of one level and further responsive to a control voltage of a different level for decoupling said input circuit from said input-output element, a second electronic switching circuit coupled to said output circuit and responsive to a control voltage of said one level for decoupling said input-output element from said output circuit and responsive to a control voltage of said different level for coupling said input-output element to said output circuit, means for selectively supplying a control voltage of said one level or said different level to said first and second electronic switching circuits simultaneously, and switchable impedance means connected in parallel with said input circuit and responsive to said control voltage of one level such that said impedance means exhibits a high impedance value, said impedance means being further responsive to said control voltage of said different level such that said impedance means exhibits a low impedance value whereby said input circuit is effectively short-circuited.

3. A signal selector system comprising three separate sets of semiconductors, a first set of semiconductors comprising a pair of transistors, input circuit means coupled to said first set of semiconductors, a second set of semiconductors comprising a pair of diodes, output circuit means coupled to a second one of said sets of semiconductors, a single magnetic transducer means coupled to both of said sets of semiconductors, control means coupled to both of said sets of semiconductors and to said transducer, said first set of semiconductors being responsive to a first condition of said control means for effecting a signal transfer path from said input circuit to said transducer means, said second set of semiconductors being responsive to a second condition of said control means for effecting a signal transfer path from said transducer to said output circuit, and a third set of semiconductors comprising a pair of diodes connected across said input circuit means and adapted to selectively place a low impedance shunt path across said input circuit means when said control means attains said second condition.

4. In a system which utilizes digital type information, the combination of a single magnetic transducer adapted to be mounted adjacent a magnetic surface which is used for storing the digital information, an input circuit, an output circuit, a first group of semiconductor devices comprising a plurality of transistors coupled between said input circuit and said transducer, a second group of semiconductor devices comprising a plurality of diodes coupled between said transducer and said output circuit, and a potential source having a plurality of output potential values, said source being coupled to each of said first and second pluralities of semiconductors where coupled to said transducer and adapted to control the operativeness of said groups of semiconductor devices such that said transistors are cut off when the output potential of said source is at one of its values and said diodes are cut off when said output of said source is at another of its values.

5. In a selective signal transmission system, an input circuit, a symmetrical transistor having one of the electrodes in its symmetrical emitter-collector circuit connected to said input circuit, a magnetic transducer connected to the other electrode in said symmetrical circuit, a diode having one of its electrodes connected to the junction of said transducer and said other transistor electrode, an output circuit being connected to the other electrode of said diode, and control means connected to said junction, said control means being operative to supply a first signal to enable said transistor and to simultaneously block said diode, said control means being operative to supply a second signal to enable said diode and to simultaneously block said transistor, said control means supplying said first and second signals at different times.

6. A switching circuit comprising a circuit selector, said selector being operative to produce a voltage signal in the form of a step pulse having two different levels, a first plurality of semiconductor devices, a second plurality of semiconductor devices, said selector being connected to each of said first and second pluralities of semiconductors in order to supply said step pulse thereto, whereby the state of conduction of said semiconductors may be controlled, transducer means, input means, said input means being connected to said transducer means via said first plurality of semiconductor devices when said step pulse is at one level, and output means, said output means being connected to said transducer means via said second plurality of semiconductor devices when said step pulse is at another level whereby said transducer means may be utilized as an input device or an output device at different times in accordance with the voltage level of the step pulse produced by said circuit selector and applied to said semiconductor devices.

7. A switching circuit comprising first and second sets of semiconductor elements, said sets of semiconductors comprising a plurality of bilateral transistors and a plurality of diodes, respectively, magnetic transducer means, said transducer means being connected to an element of each of said sets of semiconductors, control signal producing means, said signal producing means supplying control signals having a plurality of different magnitudes, said signal producing means being connected to said element of each of said semiconductor sets for selectively controlling the energization of said semiconductors in accordance with the magnitude of said control signal, input circuit means, said transistors being connected between said transducer means and said input circuit means for passing information signals from said input means to said transducer when said transistors are energized, and output circuit means, said diodes being connected between said transducer and said output means for passing information signals from said transducer to said output means when said diodes are energized.

8. In a magnetic recording system the combination of a magnetic transducer having only a single simple coil winding on a magnetic core, an input circuit, an output circuit, a pair of transistors each having one electrode thereof coupled to the opposite ends of said coil winding and another electrode thereof coupled to said input circuit, a pair of diodes coupled between the opposite ends of said coil winding on said transducer and said output circuit, and a potential source for supplying a control signal in the form of a step pulse having two different values, said source being coupled to each of said transistors and diodes at said ends of said transducer coil winding whereby said transistors are cut off when the step pulse of said source is at the lower one of its values and said diodes are cut off when said output of said source is at the higher of its values so that said output circuit or said input circuit is positively decoupled from said transducer during the operation of the other of the circuits.

9. In combination, a pair of diodes, a pair of bilateral transistors, input means connected to said pair of transistors, output means connected to said pair of diodes, input-output means connected to said pair of diodes and said pair of transistors, control signal supplying means operable to supply a control signal having two different levels, said control signal supplying means connected to the cathodes of said diodes and the collectors of said transistors, said diodes and said transistors adapted to be rendered conductive by opposite levels of the control signal, said diodes and said transistors adapted to be rendered nonconductive by opposite levels of the control signal, and a magnetic transducer connected to said transistors and said diodes, said transducer adapted to be electrically connected to said input means and said output means in accordance with the conductive state of said diodes and said transistors.

References Cited in the file of this patent

UNITED STATES PATENTS

| | | |
|---|---|---|
| 2,576,026 | Meacham | Nov. 20, 1951 |
| 2,611,025 | Jankowski | Sept. 16, 1952 |
| 2,636,133 | Hussey | Apr. 21, 1953 |
| 2,734,186 | Williams | Feb. 7, 1956 |
| 2,782,307 | Von Sivers | Feb. 19, 1957 |
| 2,813,259 | Burkhart | Nov. 12, 1957 |
| 2,816,238 | Elliott | Dec. 10, 1957 |
| 2,877,451 | Williams | Mar. 10, 1959 |
| 2,889,537 | Elliott | June 2, 1959 |
| 2,904,775 | Kosten | Sept. 15, 1959 |